(12) United States Patent
Maneval et al.

(10) Patent No.: US 11,206,272 B2
(45) Date of Patent: Dec. 21, 2021

(54) SYSTEM AND METHOD FOR DETERMINING OR MONITORING A PROCESS VARIABLE IN AN AUTOMATION PLANT

(71) Applicant: Endress+Hauser Process Solutions AG, Reinach (CH)

(72) Inventors: Michael Maneval, Schopfheim (DE); Michael Mayer, Oberwil (CH); Ingomar Sotriffer, Gundelfingen (DE)

(73) Assignee: Endress+Hauser Process Solutions AG, Reinach (CH)

( * ) Notice: Subject to any disclaimer, the term of this patent is extended or adjusted under 35 U.S.C. 154(b) by 0 days.

(21) Appl. No.: 16/337,747

(22) PCT Filed: Aug. 28, 2017

(86) PCT No.: PCT/EP2017/071537
§ 371 (c)(1),
(2) Date: Mar. 28, 2019

(87) PCT Pub. No.: WO2018/059850
PCT Pub. Date: Apr. 5, 2018

(65) Prior Publication Data
US 2020/0036729 A1    Jan. 30, 2020

(30) Foreign Application Priority Data
Sep. 30, 2016 (DE) .......... 10 2016 118 613

(51) Int. Cl.
*H04L 29/06* (2006.01)
*G05B 19/042* (2006.01)
(Continued)

(52) U.S. Cl.
CPC ........ *H04L 63/123* (2013.01); *G05B 19/0421* (2013.01); *G06F 21/64* (2013.01); *H04L 67/12* (2013.01); *H04L 63/0428* (2013.01)

(58) Field of Classification Search
CPC ... H04L 63/123; H04L 67/12; H04L 63/0428; G05B 19/0421; G06F 21/64
See application file for complete search history.

(56) References Cited

U.S. PATENT DOCUMENTS

| | | | |
|---|---|---|---|
| 10,211,679 B1* | 2/2019 | Li | H02J 50/20 |
| 2006/0047790 A1* | 3/2006 | Nguyen | G06F 9/5061 |
| | | | 709/220 |

(Continued)

FOREIGN PATENT DOCUMENTS

| | | |
|---|---|---|
| EP | 2966520 A2 | 1/2016 |
| WO | 2011154212 A1 | 12/2011 |

OTHER PUBLICATIONS

Houyou, Amine M., Huth, Hans-Peter, Trsek, Henning, Kloukinas, Christos and Rotondi, Domenico, Agile Manufacturing General Challenges and an IoT @ Work Perspective, 17th IEEE International, 7 pp.

(Continued)

*Primary Examiner* — Thomas C Lee
*Assistant Examiner* — Charles Cai
(74) *Attorney, Agent, or Firm* — Kelly J. Smith; Endress+Hauser (USA) Holding Inc.

(57) ABSTRACT

The present disclosure relates to a system and method for determining or monitoring a process variable having a higher-level unit and a plurality of field devices. The field devices generate data and are connected to one another for communication, and the higher-level unit and the field devices are nodes corresponding to a distributed ledger or blockchain technology comprising transaction creation units. Each field device is assigned a transaction creation unit for creating transactions. A created transaction contains data from the field devices assigned to the transaction creation units. A block creation unit processes a created transaction to form a data block. Validation units check the data block and/or transactions for validity. The data block is valid if at least one predefined number of validation units validates the data block, wherein each node is assigned one (Continued)

of the validation units. The valid data block is stored in a distributed database.

17 Claims, 2 Drawing Sheets

(51) Int. Cl.
　　　*G06F 21/64*　　　(2013.01)
　　　*H04L 29/08*　　　(2006.01)

(56) References Cited

U.S. PATENT DOCUMENTS

| | | |
|---|---|---|
| 2016/0261690 A1 | 9/2016 | Ford |
| 2017/0031676 A1* | 2/2017 | Cecchetti .............. H04L 9/3236 |
| 2017/0102678 A1* | 4/2017 | Nixon ................ G05B 19/4185 |
| 2018/0088928 A1* | 3/2018 | Smith ..................... H04L 67/34 |
| 2019/0166459 A1* | 5/2019 | Wootton ............. G11C 11/2273 |
| 2019/0260707 A1* | 8/2019 | Kesavan ............. H04L 61/6004 |
| 2019/0340361 A1* | 11/2019 | Daniel .................. H04W 12/10 |

OTHER PUBLICATIONS

Houyou, Amine M., Huth and Hans-Peter, Internet of Things at Work: Enabling Plug-and-Work in Automation Networks, Siemens AG, Germany, 11 pp.

Tian, Feng, An Agri-food Supply Chain Traceability System for China Based on RFID & Blockchain Technology, Vienna University of Economics and Business, Vienna, Austria, 6 pp.

Audet, David, De Oliveira, Leandro Collares, Macmillian, Neil, Marinakis, Dimitri and Wu, Kui, Scheduling Recurring Tasks in Energy Harvesting Sensors, IEEE Infocom 2011 Workshop on Green Communications and Networking, 6 pp.

\* cited by examiner

SYSTEM AND METHOD FOR DETERMINING OR MONITORING A PROCESS VARIABLE IN AN AUTOMATION PLANT

CROSS-REFERENCE TO RELATED APPLICATIONS

The present application is related to and claims the priority benefit of German Patent Application No. 10 2016 118 613.9, filed on Sep. 30, 2016 and International Patent Application No. PCT/EP2017/071537, filed on Aug. 28, 2017, the entire contents of which are incorporated herein by reference.

TECHNICAL FIELD

The invention relates to a system for determining or monitoring a process variable in an automation plant. In addition, the invention includes a method for determining or monitoring a process variable in an automation plant.

BACKGROUND

Field devices that are used in industrial plants have already become known from prior art. Field devices are often used in both process automation technology and in production automation technology. In principle, field devices are all devices that are employed at line and that supply or process data or information related to the process. Field devices are thus used for detecting and/or influencing process variables. Measuring instruments or sensors are used to record process variables. Such instruments or sensors are used, for example, for pressure and temperature measurement, conductivity measurement, flow measurement, pH measurement, filling level measurement, etc. and record the corresponding process variables of pressure, temperature, conductivity, pH value, level, flow rate, etc. Actuators are used to influence process variables. These include, for example, pumps or valves that can influence the flow of a liquid in a pipe or the filling level in a container. In addition to the aforementioned measuring devices and actuators, field devices are also understood to include remote I/Os, radio adapters and general devices that are arranged at the field level.

The Endress+Hauser Group produces and distributes a large number of such field devices.

In modern industrial plants, field devices are usually connected to higher-level units via communication networks such as fieldbuses (Profibus®, Foundation® Fieldbus, HART®, etc.). Normally, the higher-level units comprise control units, such as an SPC (stored program control) or a PLC (programmable logic controller). The higher-level units are used, among other things, for process control and for commissioning the field devices. The measured values detected by the field devices, in particular by sensors, are transmitted via the respective bus system to one (or several) higher-level unit(s), which process the measured values where necessary and forward them to the control station of the plant. The control station is used for process visualization, process monitoring and process control via the higher-level units. In addition, data transmission from the higher-level unit via the bus system to the field devices is also required, in particular for configuration and parameterization of field devices and for controlling actuators.

Field devices create a variety of different data. In addition to the measurement data from the aforementioned sensors, through which a plant operator receives information about the current process values of the measuring points, such as control data, for example for the position control of an actuator. In addition, the data comprises diagnostic, historical and/or status data, which inform the plant operator of problems with the field devices or the current status of the individual field devices, or calibration/parameterization data.

It is common practice nowadays to store such data at a central location in the plant, for example in a database in a workstation PC at the control level of the plant. However, this has disadvantages: If the database fails or is destroyed or unreadable, the data stored in such database is lost.

In addition, the data can be manipulated since it is often sent over the communication network without encryption or stored in the database without encryption. If data is manipulated afterwards, it can only be tracked with great difficulty or, due to the large amount of stored data, it can only be noticed very late.

SUMMARY

Starting from this problem, the invention is based on the object of presenting a method and a system that allows data from a large number of field devices to be stored in a process automation plant in a manner that is secure (against manipulation).

The object is accomplished by a system for determining or monitoring a process variable in an automation plant having at least one higher-level unit and a plurality of field devices, each of which having a sensor and/or actuator and an electronic unit, wherein the field devices generate data, which in particular comprise measurement data, control data, calibration/parameterization data, diagnostic, historical and/or status data, wherein the field devices are connected to one another for communication via a wireless or wired communication network, and wherein the higher-level unit and the field devices are nodes corresponding to a distributed ledger or blockchain technology comprising:

a plurality of transaction creation units, wherein each of the field devices is assigned one of the transaction creation units, wherein the transaction creation units create transactions and wherein a created transaction contains data from the field devices respectively assigned to the transaction creation units;

at least one block creation unit, which at regular intervals processes at least one created transaction to form a data block;

a plurality of validation units, which check the data block and/or the transactions for validity, wherein the data block is valid if at least one predefined number of validation units validates the data block successfully, and wherein each of the nodes is assigned one of the validation units; and a plurality of decentrally distributed databases for storing data blocks, wherein the valid data block is stored in each of the databases.

In the system according to the invention, the data generated by the field devices is stored decentrally in a plurality of databases. It is provided that the same data is stored and available in all databases at all times. If one or more databases fail or are manipulated by an attacker, the data or information can be read from the remaining databases, making a complete loss of data virtually impossible.

In addition to the aspect of decentralized storage, the system according to the invention has the great advantage that the data is stored in the databases in the form of data blocks in a manner secure against manipulation. Before such a data block is created, the transactions of all field devices and higher-level units, collectively referred to as "nodes", are checked for validity. In particular, the system checks whether the creator of the transaction—usually the field device that generates the data contained in the transaction— is a valid node, or that the data contained in the transaction is within a valid range of values, for example. This prevents the infiltration of nodes which are not intended by the plant operator and which could endanger the condition of the plant.

An additional level of protection against manipulation is achieved by the fact that the data blocks themselves are validated by a specified number of nodes before the data blocks are stored in the databases. In particular, a successful validation of more than half of all nodes is required for this purpose. As such, to infiltrate a foreign, harmful data block, an attacker would have to manipulate or control a large number of nodes in order to successfully validate the infiltrated data block. With an increasing number of nodes, this can be regarded as virtually impossible.

Field devices that are mentioned in connection with the invention are already described by way of example in the introductory part of the description.

In accordance with a particularly preferred design of the system according to the invention, it is provided that the data block is designed according to a data block of the blockchain technology and is linked according to blockchain technology with data blocks created at earlier points in time. The data block is designed in such a manner that it contains a data area and a checksum in the form of a hash value. The data area contains all transactions that were generated after the last data block was created. Such transactions are calculated to an intermediate value using an algorithm; for example, the "Merkle root" of all transactions contained in the data area of the data block is calculated. The hash value of the data block is generated from such intermediate value and the hash value of the preceding data block.

The data block is validated in such a manner that its hash value is examined. The data block can only be validated successfully if the valid hash value of the previous data block is used. This means that data in a successfully validated data block cannot be changed without changing the subsequent data blocks accordingly. A change of data generates a changed intermediate value, which also changes the hash value of the respective data block. Thus, the subsequent data block no longer matches its previous data block. Thus, once a data block has been successfully validated, data can no longer be changed by an attacker.

In accordance with an advantageous additional form of the system according to the invention, it is provided that the block creation unit is implemented in the higher-level unit. Since complex algorithms are executed to create a data block as described above, it is advantageous to execute this block creation in a component of the system that has sufficient computing power and an energy supply sufficient to create the data block. Field devices, which are designed in particular as two-wire field devices, often receive their energy via the communication network. The amount of energy that is made available to the field device in this manner is sometimes very small. A higher-level unit, which represents for example a control unit or a monitoring unit, often has an external power supply and therefore sufficient electrical energy available.

An advantageous design of the system according to the invention provides for one of the decentrally distributed databases to be arranged in each node. The databases receive all data blocks at any time, such that all databases have the identical amount of data. For databases, non-volatile memories such as hard disks or solid-state drives (SSD), or media based on flash memories such as memory cards or memory sticks, are used in particular.

In a further advantageous design of the system according to the invention, it is provided that the higher-level unit is a control unit, in particular a programmable logic controller, or a workstation PC at the control level of the plant.

In accordance with a preferred design of the system according to the invention, the system includes additional nodes in the form of gateways, remote input/output units, and/or edge devices containing a block creation unit and/or a validation unit. This makes it possible to easily upgrade plants that have older higher-level units that do not have the power required for block creation by implementing an additional device in the plant. Thus, the plant operator is not forced to replace or upgrade components of the control level, which limits the additional costs for the plant operator.

In accordance with an advantageous design of the system according to the invention, it is provided that the transaction creation units are integrated in the electronic units of the field devices or that the field devices have modular auxiliary electronic units, in particular plug-in modules, in which the transaction creation units are implemented. In contrast to the creation of a data block, which sometimes requires complex arithmetic operations, the creation of a transaction requires significantly less power, such that the field devices do not need an additional power supply and can also be supplied with energy via the communication network.

In modern field devices, which have a microprocessor and a writable memory, the transaction creation unit can also be formed by such electronic components. The algorithms/software commands required for this can, for example, be loaded onto the writable memory in the form of a firmware update.

Older field devices for which such an update is not possible, or whose performance is too low to implement the transaction creation unit by means of its proprietary electronic components, may be given an auxiliary electronic unit on which the transaction creation unit is provided.

In accordance with a particularly advantageous design of the system according to the invention, it is provided that the validation units are integrated in the electronic units of the field devices and in the higher-level unit, or that the field devices and/or the higher-level unit have modular auxiliary electronic units, in particular plug-in modules, in which the transaction creation units are implemented. In a manner analogous to creating transactions, the validation of transactions and/or data blocks requires significantly less power than creating a data block, such that field devices do not need an additional power supply and can be supplied with energy over the communication network.

In modern field devices, which have a microprocessor and a writable memory, the validation unit can also be formed by such electronic components. The algorithms/software commands required for this can, for example, be loaded onto the writable memory in the form of a firmware update.

Older field devices for which such an update is not possible, or whose performance is too low to implement the validation unit by means of its proprietary electronic components, may be given an auxiliary electronic unit on which the transaction creation unit is provided.

A preferred further development of the system according to the invention provides that the transaction creation units and the validation units of the field devices are located in a common electronic unit or in a common auxiliary electronic unit, as the case may be. The space requirement is reduced and efficiency is increased through the use of interconnected electronic components.

An additional preferred further development of the system according to the invention provides that each field device has an energy supply unit that supplies the field devices, in particular the electronic unit of the field devices, by means of energy that is obtained via the communication network.

A particularly advantageous embodiment of the system according to the invention provides that each of the field devices has an energy storage unit that absorbs and stores energy from the environment and/or provides energy, and supplies the field devices, in particular the electronic unit of the field devices, with the stored or provided energy, as the case may be.

A first variant of the system according to the invention provides that the energy storage unit is designed in such a manner that it absorbs energy via the communication network. Thereby, the absorbed energy is temporarily stored in the energy storage unit. It may be provided that the temporarily stored energy is made available to the electronic unit of the field device if the temporarily stored amount of energy exceeds a predefined value or if the energy storage device is fully charged.

A second variant of the system according to the invention provides that the energy storage unit comprises a solar cell, a fuel cell and/or a battery, in particular a rechargeable battery. Thereby, the energy storage unit is independent of the communication network.

It is self-evident that, in addition to the conversion of solar energy into electrical energy, other physical principles can also be used to extract energy from the environment, for example by converting vibration into electrical energy, by converting magnetic fields into electrical energy, etc.

In a particularly advantageous further development of the system according to the invention, the energy storage unit comprises at least one capacitor and/or one accumulator. Both components permit the storage and output of energy without the component having to be fully charged.

Thereby, it may be provided that the energy supply unit is combined with the energy storage unit. In normal operating mode, the field device is supplied with the energy provided by the communication network via the energy supply unit. To perform an additional functionality using the transaction creation unit and/or the validation unit, the field device receives the additional energy required via the energy storage unit.

In accordance with an advantageous design of the system according to the invention, it is provided that the communication network comprises a fieldbus of automation technology. In particular, it thereby comprises a fieldbus with the HART, FOUNDATION Fieldbus, PROFIBUS PA, PROFIBUS DP, CANbus, Modbus, etc. fieldbus protocols. In principle, any common protocol of a fieldbus or protocols related to Industrial Ethernet, such as PROFINET or EtherNet/IP, can be used.

In accordance with a preferred additional form of the system according to the invention, the communication network comprises a local area network or a wide area network, in particular the Internet.

Furthermore, the object is accomplished by the method for determining or monitoring a process variable in an automation plant having at least one higher-level unit and a plurality of field devices, each of which has a sensor and/or actuator and an electronic unit, wherein the field devices generate data, which in particular comprise measurement data, control data, calibration/parameterization data, diagnostic and/or status data, wherein the field devices are connected to one another for communication in a communication network, and wherein the higher-level unit and the field devices are nodes that function and interact according to blockchain technology, comprising:

The creation of at least one transaction, wherein the transaction contains at least one subset of the data generated by the field devices;

The processing of the created transaction into one data block;

The transmission of the created data block to each of the nodes via the communication network;

The validation of the data block by all nodes, wherein the data block is valid if at least half of all validation units validate the data block successfully; and The storage of the valid data block in a plurality of decentrally distributed databases.

In an advantageous embodiment of the method according to the invention, it is provided that the created transaction is transmitted to all nodes before it is processed in the data block and validated by the nodes, and that the created transaction is only processed in the data block if it is successfully validated by at least one of the nodes. In particular, the system checks whether the creator of the transaction—usually the field device that generates the data contained in the transaction—is a valid node, or whether the data contained in the transaction is within a valid range of values, for example.

In accordance with a preferred additional form of the method according to the invention, it is provided that a potential node will transmit a request to participate to all nodes and will only be integrated as a new node if at least one predefined number of validation units successfully validates the request to participate. In this manner, the integration of an unauthorized device into the network can be prevented.

BRIEF DESCRIPTION OF THE DRAWINGS

The invention is explained in greater detail with reference to the following figures. The following is shown.

DETAILED DESCRIPTION

Figure 1:
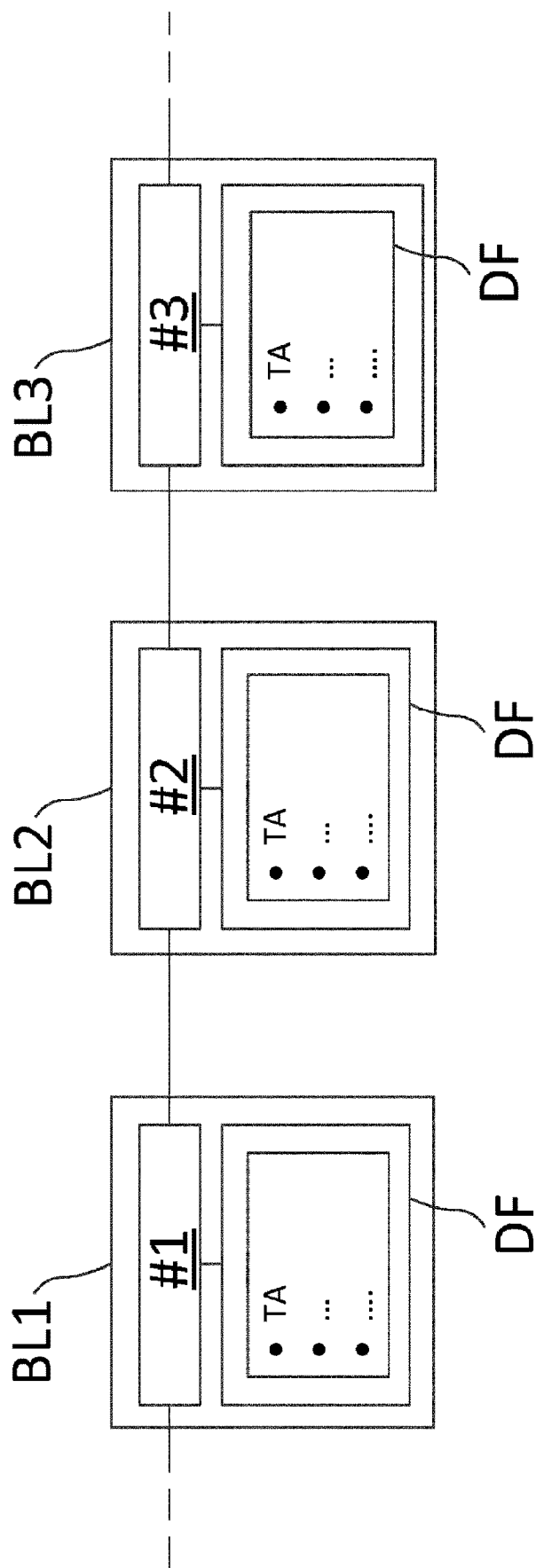
FIG. 1 shows an exemplification of data blocks designed according to blockchain technology.

FIG. 1 shows an exemplification of data blocks BL1, BL2, BL3, which are designed according to blockchain technology. Blockchain technology has become known as the backbone of the "Bitcoin" Internet currency. A blockchain, i.e. a chain of linked data blocks BL1, BL2, BL3, allows a high degree of data integrity. In the following, the functionality of a blockchain, designed for the method according to the invention, is briefly described.

As a rule, any such data block BL1, BL2, BL3 consists of at least two components: On the one hand, this is a data field DF. This data field DF stores data in the form of transactions TA. A transmission of data from a first node TK to a second node TK in a communication network F is designated as a transaction TA. A transaction TA contains a transmitted value, in this case data, along with the transmitter and receiver of the transaction TA. All devices that use blockchain technology in the communication network F are designated as nodes TK.

A data field DF of a data block BL1, BL2, BL3 contains at least one transaction TA, more often multiple transactions TA.

On the other hand, a data block BL1, BL2, BL3 contains a checksum #1, #2, #3. Such a checksum #1, #2, #3 is a hash value and is sometimes created by complex calculations. For this purpose, all transactions TA of the data field of a block BL1, BL2, BL3 are calculated for an intermediate value. For example, the Merkle root of the total number of transactions TA is calculated for this purpose. The exact functional principle is not discussed at this juncture. For this purpose, reference is made to https://en.wikipedia.org/wiki/Merkle_tree.

Such calculated intermediate value is then set off against the checksum #1, #2, #3 of the previous data block BL1, BL2, BL3 for the checksum #1, #2, #3 of the current data block BL1, BL2, BL3. For example, the data block BL2 shown in FIG. 1 contains a checksum #2. Thus, such checksum #2 was calculated from the transactions TA stored in the data field DF of the data block B2 and the checksum #1 of the preceding data block BL1. By analogy, the data block BL3 shown in FIG. 1 contains a checksum #3. Thus, such checksum #3 was calculated from the transactions TA stored in the data field DF of data block B3 and the checksum #2 of the preceding data block BL2.

The integrity of the data, i.e. the protection of the data against subsequent manipulation, is thus ensured by storing the checksum #1, #2, #3 of the preceding data block BL1, BL2 in the following data block BL2, BL3. Thus, a blockchain consists of a series of data blocks BL1, BL2, BL3, in each of which one or more transactions TA are combined and provided with the checksum #1, #2, #3. A change of data generates a changed intermediate value, by which the checksum #1, #2, #3 of the respective data block BL1, BL2, BL3 also changes. Therefore, the following data block BL1, BL2, BL3 no longer matches the preceding data block BL1, BL2, BL3. As a result, data of a successfully validated data block BL1, BL2, BL3 can no longer be changed by an attacker.

New data blocks BL1, BL2, BL3 are created at regular intervals. In the data field of the new data block BL1, BL2, BL3, all transactions TA that were created after the time of the creation of the last data block BL1, BL2, BL3 are stored.

The complexity of the block creation can be increased by the fact that the created checksum #1, #2, #3 must have a predefined format. For example, it is specified that the checksum must be 24 digits long, with the first four digits having a numerical value of 0. For this purpose, in addition to the intermediate value of the transactions TA and the checksum of the previous data block, a sequence of numbers to be determined, known as a "nonce," with a fixed length, is used to calculate the checksum #1, #2, #3 of the current data block BL1, BL2, BL3. The calculation of the new checksum #1, #2, #3 takes longer, because there are only a few nonces that lead to the calculation of a checksum #1, #2, #3 with the given criteria. Finding such a suitable nonce thereby causes the described additional expenditure of time.

After the checksum #1, #2, #3 of a new data block BL1, BL2, BL3 has been created, the data block is transmitted to all nodes TK. The nodes TK then examine the checksum #1, #2, #3 of the new data block BL1, BL2, BL3. Only after successful validation is the data block BL1, BL2, BL3 stored in all nodes TK. In particular, this requires the successful validation of more than half of all nodes TK. Therefore, to infiltrate/create a foreign, harmful data block BL1, BL2, BL3, an attacker would have to manipulate or control a large number of nodes TK in order to successfully validate the infiltrated data block BL1, BL2, BL3. With an increasing number of TK nodes, this can be regarded as virtually impossible.

The validation of a data block BL1, BL2, BL3 requires significantly less effort than the creation of the data block BL1, BL2, BL3. The checksum #1, #2, #3 is calculated back, the intermediate value of the transactions TA or the checksum #1, #2, #3 of the previous data block BL1, BL2, BL3, as the case may be, is recovered and this is compared with the actual intermediate value or with the actual checksum #1, #2, #3 of the previous data block BL1, BL2, BL3. If such values match, the data block BL1, BL2, BL3 is successfully validated.

The following section describes how this method can be used to store data from a process automation plant A in a manner secure against manipulation.

Figure 2:
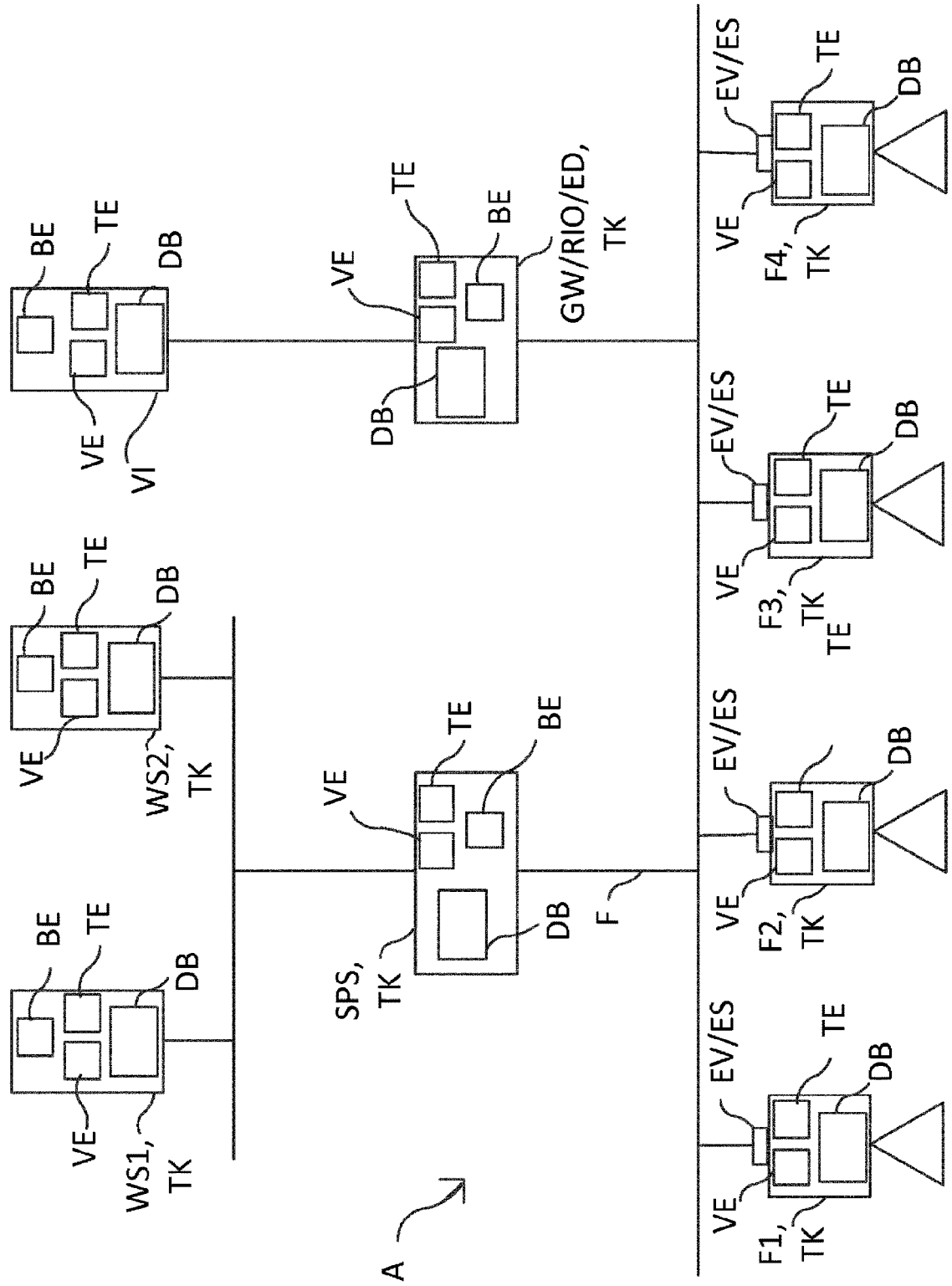
FIG. 2 shows a first embodiment of the system according to the present disclosure.

FIG. 2 shows one design of the system according to the invention. A plant A with automation technology is shown. Multiple computer units WS1, WS2 in the form of workstation PCs in the control level of plant A are connected to a communication network F. Such computer units serve as higher-level units (control system or control unit), among other things for process visualization, process monitoring and engineering, such as for operating and monitoring field devices F1, F2, F3, F4. The control level of plant A is connected to multiple field devices F1, F2, F3, F4 via a control unit SPS, which is designed, for example, as a programmable logic controller and is essentially also designated as a higher-level unit. The field devices F1, F2, F3, F4 can be either sensors or actuators. The fieldbus FB works according to one of the well-known fieldbus standards, such as PROFIBUS, FOUNDATION Fieldbus or HART. Instead of the fieldbus, it can also comprise a local area network or a wide area network, for example the Internet. Furthermore, a visualization unit VE for visualizing process measured values or status values of the field devices F1, F2, F3, F4 [is] connected to the field devices F1, F2, F3, F4 via a link device GW/RIO/ED, which can be a gateway GW, a remote IO RIO or an edge device ED.

Each of the components, i.e. the workstation PCs WS1, WS2, the field devices F1, F2, F3, F4, along with the control unit SPS, the link device GW/RIO/ED and the visualization unit VI form nodes TK for a blockchain communication network.

Each of the nodes TK has a database DB. The DB databases are designed in such a manner that one of the decentrally distributed DB databases is arranged in each node TK. The databases DB receive all data blocks at any time, such that all databases DB have the identical amount of data. For the databases DB, non-volatile memories such as hard disks or solid-state drives (SSD), memory cards or memory sticks are used in particular.

Each node has a transaction creation unit TE to create transactions TA in accordance with the requirements (see FIG. 1). The transactions TA receive data of the respective nodes TK. In addition to measurement data from field devices F1, F2, F3, F4, which have sensors, such data also includes control data, for example for position control of a field device F1 F2, F3, F4, which has an actuator. Furthermore, the data comprise diagnostic, historical and/or status data, which inform the plant operator of problems with field devices or the current status of the individual field devices F1, F2, F3, F4.

The transaction creation units TE are integrated in the electronic units of the nodes TK. However, it can also be provided that the transaction creation unit TE is made available on modular auxiliary electronic units, in particular plug-in modules.

Those nodes TK that have a sufficient energy supply or sufficiently large computing power have a block creation unit BE, with which data blocks BL1, BL2, BL3, as described above, are created.

Furthermore, it is provided that each node TK has a validation unit VE. Using such validation units VE, the nodes TK validate newly created data blocks BL1, BL2, BL3. An additional function of the validation units VE is that the created transactions TA are transmitted to all nodes TK prior to processing in a data block BL1, BL2, BL3 and are validated by the nodes TK. A created transaction TA is only processed in the data block BL1, BL2, BL3 if it is successfully validated by at least one of the nodes TK. In particular, the system checks whether the creator of transaction TA is a valid node TK, or whether the data contained in transaction TA is within a valid range of values, for example.

The validation units VE are integrated in the electronic units of the nodes TK. However, it can also be provided that the validation units VE are made available on modular auxiliary electronic units, in particular plug-in modules. Furthermore, it can be provided that the transaction creation units TE and the validation units VE of the nodes are located in a common electronic unit or in a common auxiliary electronic unit. The space requirement is reduced and efficiency is increased through the use of interconnected electronic components.

In particular, the field devices F1, F2, F3, F4 frequently have a low energy supply. For this reason, it is provided that the block creation units BE are integrated in the field devices only if the energy supply or the computing power of the field devices F1, F2, F3, F4 is sufficient for this purpose.

Conventionally, it is provided that each of the field devices F1, F2, F3, F4 has an energy supply unit EV, which supplies the field devices F1, F2, F3, F4, in particular the electronic unit of the field devices F1, F2, F3, F4, by means of energy that is obtained via the communication network F. Since, in this manner, the energy output as described above is frequently low, it is possible that each of the field devices F1, F2, F3, F4 has an energy storage unit ES, which receives and stores energy from the environment and/or provides energy, and supplies the field devices F1, F2, F3, F4, in particular the electronic unit of the field devices F1, F2, F3, F4, with the stored or provided energy.

For example, the energy absorbed via the communication network F is temporarily stored in the energy storage unit ES. It may be provided that the temporarily stored energy is only made available to the electronic unit of the corresponding field device F1, F2, F3, F4 when the temporarily stored amount of energy exceeds a predefined value or when the energy storage device is completely charged. Thereby, the energy storage unit has at least one capacitor and/or one accumulator. Both components permit the storage and output of energy without the component having to be fully charged.

However, it may also be provided that the energy storage unit ES comprises a solar cell, a fuel cell and/or a battery, in particular a rechargeable battery. In this case, the energy storage unit ES is independent of the communication network F.

It is advantageous to combine the energy supply unit EV with the energy storage unit ES. In normal operating mode, the field device F1, F2, F3, F4 is supplied with the energy provided by the communication network F via the energy supply unit EV. To carry out an additional functionality using the transaction creation unit TE and/or the validation unit VE, the field device F1, F2, F3, F4 receives the additional energy required via the energy storage unit ES.

Finally, a few advantages of the system according to the invention are listed once again:

Decentralized storage of data of plant A in multiple DB databases instead of one central DB database, reducing data vulnerability;

Data integrity through linking the data blocks BL1, BL2, BL3; and

Passing through of multiple validation processes, by which only transactions TA that meet the requirements or valid data blocks BL1, BL2, BL3 are stored.

It is self-evident that that the embodiments shown are of an exclusively exemplary nature and that the method in accordance with the invention can be carried out with any type and arrangement of nodes TK in a process automation plant A.

LIST OF REFERENCE SIGNS

A Process automation plant
BE Block creation unit
BL1, BL2, BL3 Data block
DB Database
ED Edge device
ES Energy storage unit
EV Energy supply unit
F1, F2, F3, F4 Field device
F Communication network
GW Gateway
RIO Remote IO
SPS Control unit
TA Transaction
TE Transaction creation unit
TK Node
VE Validation unit
VI Visualization unit
WS1, WS2 Workstation PC
1, #2, #3 Hash values of the data blocks

The invention claimed is:

1. A system for determining or monitoring a process variable in an automation plant, comprising:

at least one higher-level unit; and a plurality of field devices, wherein each of the field devices has a sensor and/or actuator and an electronic unit, wherein the field devices generate data including measurement data, control data, calibration data, diagnostic, historical and/or status data;

wherein the field devices are connected to one another for communication via a wireless or wired communication network;

wherein the higher-level unit and the field devices are nodes corresponding to a distributed ledger or blockchain technology:

wherein the system is configured to:
create transactions using a plurality of transaction creation units, wherein each of the field devices is assigned one of the transaction creation units, wherein a created transaction contains data from the field devices assigned to each of the transaction creation units wherein the transaction creation units are integrated in the electronic units of the field devices or modular auxiliary electronic units of the field devices;

wherein the created transaction includes measurement values by sensors of the field devices;

process at least one created transaction to form a data block at regular intervals using at least one block creation unit, wherein the block creation unit is implemented in the higher-level unit;

check the data block and/or the transactions for validity using a plurality of validation units, wherein the transactions are generated by valid nodes, wherein the data block is valid if at least more than half of the validation units validates the data block successfully, wherein each of the nodes is assigned one of the validation units; and store data blocks using a plurality of decentrally distributed databases for storing data blocks, wherein the valid data block is stored in each of the databases.

2. The system of claim 1, wherein the data block is designed according to a data block of the blockchain technology and is linked according to blockchain technology with data blocks created at earlier points in time.

3. The system of claim 1, wherein one of the decentrally distributed databases is arranged in each node.

4. The system of claim 1, wherein the higher-level unit is a control unit or a workstation PC at a control level of the plant.

5. The system of claim 1, wherein the system includes additional nodes, wherein the additional nodes are gateways, remote input/output devices (RIOs), and/or edge devices containing the block creation unit and/or the validation unit.

6. The system of claim 1, wherein the validation units are integrated in the electronic units of the field devices and in the higher-level unit, or in modular auxiliary electronic units of the field devices and/or the higher-level unit.

7. The system of claim 6, wherein the transaction creation units and the validation units of the field devices are located in a common electronic unit or in a common auxiliary electronic unit.

8. The system of claim 7, wherein each field device has an energy supply unit that supplies the field device with energy that is obtained via the communication network.

9. The system of claim 7, wherein each of the field devices has an energy storage unit that absorbs and stores energy from the environment and/or provides energy, wherein the energy storage unit supplies the field device with the stored or provided energy.

10. The system of claim 9, wherein the energy storage unit is designed in such a manner that it absorbs energy via the communication network.

11. The system of claim 9, wherein the energy storage unit comprises a solar cell, a fuel cell and/or a battery.

12. The system of at least one of claim 9, wherein the energy storage unit comprises at least one capacitor and/or one accumulator.

13. The system of claim 1, wherein the communication network comprises a fieldbus of the automation plant.

14. The system of claim 1, wherein the communication network comprises a local area network or a wide area network.

15. A method for determining or monitoring a process variable in an automation plant having at least one higher-level unit and a plurality of field devices, wherein each field device has a sensor and/or actuator and an electronic unit, wherein the field devices generate data including measurement data, control data, calibration data, diagnostic, historical and/or status data, wherein the field devices are connected to one another for communication via a communication network, and wherein the higher-level unit and the field devices are nodes that function and interact according to blockchain technology, the method comprising steps of:

creating at least one transaction, wherein the transaction contains at least one subset of the data generated by the field devices, wherein transaction creation units are integrated in the electronic units of the field devices or modular auxiliary electronic units of the field devices;

processing the transaction into one data block, wherein block creation units are implemented in the higher-level unit;

transmitting the data block to each of the nodes via the communication network;

validating the data block by all the nodes, wherein the transaction is generated by a valid node, wherein the data block is valid if at least half of all nodes validate the data block successfully; and storing the valid data block in a plurality of decentrally distributed databases;

wherein the created transaction includes measurement values by sensors of the field devices.

16. The method of claim 15, wherein the transaction is transmitted to all nodes before it is processed into the data block and validated by the nodes, wherein the transaction is only processed into the data block if it is successfully validated by at least one of the nodes.

17. The method of claim 15, wherein a potential node will transmit a request to participate to all nodes and will only be integrated as a new node if at least one predefined number of nodes successfully validate the request to participate.

* * * * *